United States Patent [19]

Hamano

[11] Patent Number: 5,046,599
[45] Date of Patent: Sep. 10, 1991

[54] ARTICLE HAND-OFF APPARATUS
[75] Inventor: Itirou Hamano, Ishikawa, Japan
[73] Assignee: Shibuya Kogyo Co., Ltd., Ishikawa, Japan
[21] Appl. No.: 376,848
[22] Filed: Jul. 7, 1989
[30] Foreign Application Priority Data Aug. 17, 1988 [JP] Japan ................. 63-204235

[51] Int. Cl.⁵ .......................................... B65G 29/00
[52] U.S. Cl. ............................ 198/481.1; 198/480.1; 198/473.1
[58] Field of Search ............... 198/480.1, 481.1, 473.1, 198/803.11, 479.1

[56] References Cited

U.S. PATENT DOCUMENTS

| 1,844,869 | 2/1932 | Hauser et al. | 198/480.1 |
| 2,155,088 | 4/1939 | Hopkins | 198/480.1 X |
| 2,324,312 | 7/1943 | Meyer et al. | 198/473.1 X |
| 3,780,847 | 12/1973 | Faessler et al. | 198/480.1 X |
| 3,957,154 | 5/1976 | Shiba | 198/473.1 X |
| 4,479,343 | 10/1984 | Tincati | 198/480.1 X |

FOREIGN PATENT DOCUMENTS

| 2623309 | 12/1977 | Fed. Rep. of Germany | 198/473.1 |
| 1459406 | 11/1966 | France | 198/481.1 |
| 51-8077 | 1/1976 | Japan . | |
| 54-114279 | 8/1979 | Japan . | |
| 61-211220 | 9/1986 | Japan . | |
| 62-74623 | 5/1987 | Japan . | |
| 0431377 | 8/1967 | Switzerland | 198/480.1 |
| 1058855 | 12/1983 | U.S.S.R. | 198/480.1 |

Primary Examiner—H. Grant Skaggs
Assistant Examiner—James R. Bidwell
Attorney, Agent, or Firm—Flynn, Thiel, Boutell & Tanis

[57] ABSTRACT

An article hand-off apparatus comprises a rotatable body having a plurality of article receiving pockets formed around its outer peripheral surface, and an arcuate guide member disposed in surrounding relationship with the outer peripheral surface of the body. An article received in one of the pockets is conveyed along the arcuate guide member. The pocket size is adjusted in accordance with the size of articles to be conveyed. Both the rotatable body and the arcuate guide member are integrally movable in a direction substantially perpendicular to the direction in which an article travels at an article hand-off position, thus allowing articles to be handed over at a proper position.

8 Claims, 4 Drawing Sheets

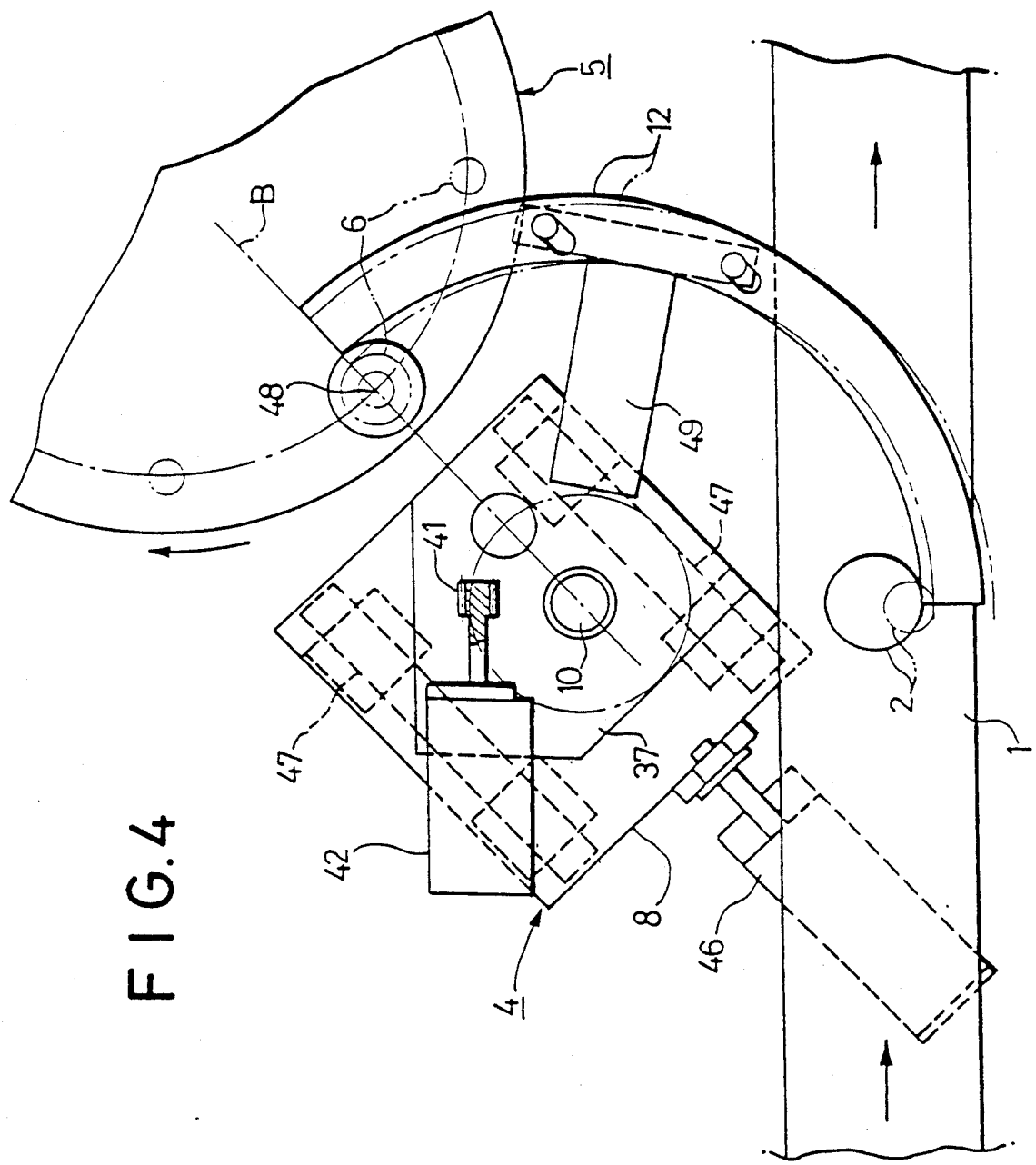

ARTICLE HAND-OFF APPARATUS

FIELD OF THE INVENTION

The invention relates to an article hand-off apparatus, and more particularly, to such apparatus which is disposed between a timing screw located alongside a conveyor and a filling machine, for example, to hand a vessel therebetween.

DESCRIPTION OF THE PRIOR ART

An article hand-off apparatus is known in the art including a rotatable body carrying a plurality of article receiving pockets formed around its outer peripheral surface, and an arcuate guide member which is disposed in surrounding relationship with the periphery of the body. An article which is delivered from a machine located upstream is received in one of the pockets and is angularly driven around the inner periphery of the arcuate guide member to be delivered to another machine which is located downstream.

In an article hand-off apparatus of the kind described which is known heretofore, the magnitude of the curvature of the inner peripheral surface of the arcuate guide member with respect t the center of rotation of the rotatable body as well as the size of the pockets are uniquely defined in accordance with the size of articles to be conveyed. Accordingly, when articles to be conveyed are changed, there has been a need to change the rotatable body and the arcuate guide member so that the pocket size as well as the curvature correspond to the size of new articles.

To overcome such difficulty, there has been proposed an article hand-off apparatus including a rotatable body carrying a plurality of article receiving pockets formed around its outer peripheral surface, an arcuate guide member disposed in surrounding relationship with the periphery of the body, and regulating means for adjusting the pocket size in accordance with the size of articles to be conveyed and for adjusting the clearance between the article and the inner peripheral surface of the arcuate guide member to a given value (see Japanese Laid-Open Pat. Application No. 8,077/1976). Articles delivered from an upward machine are received into the pockets, and then angularly driven around the inner periphery of the arcuate guide member to be delivered to a downward machine.

Another article hand-off apparatus is also proposed (see Japanese Pat. Publication No. 211,220/1986 and Japanese Laid-Open Utility Model Application No. 74,623/1987) in which the arcuate guide member is changed when adjusting the pocket size by the regulating means so that the center of articles which are supported in the pockets assumes a given position regardless of the size of different articles or in a way such that the locus of movement of the center of articles of different sizes remains coincident.

In an article hand-off apparatus of the kind described, the regulating means which adjusts the pocket size is designed to adjust the size of a pocket which is defined between a pair of crossing arms and which can be adjusted by controlling the angle at which the pair of arms crosses each other. In another design, a pair of discs are disposed in overlapping relationship and are peripherally formed with notches so that aligned notches define pockets. In this manner, the pocket size can be adjusted by rotating the both discs relative to each other to adjust the degree of alignment of corresponding notches.

In the first apparatus mentioned above in which only the pocket size can be adjusted, the clearance between the article and the inner periphery of the arcuate guide member can be adjusted, affording an advantage that a change in the size of articles can be accommodated for without requiring a change of the arcuate guide member. On the other hand, since the article is conveyed along the inner peripheral surface of the arcuate guide member, an article having a reduced size will have its center located radially outward with respect to the center of rotation of the rotatable body as compared with the center of a different article having a greater size. Consequently, where a machine which is disposed downstream includes a filling nozzle disposed at a given location as is found in a filling machine, it is impossible to dispose the mouth or opening of vessels having greatly different sizes directly below the filling nozzle.

By contrast, in the second apparatus mentioned above in which the arcuate guide member is changed at the same time the pocket size is to be adjusted, it is possible to bring the vessel to a position immediately below the filling nozzle with the center of its mouth uniformly positioned independently from the size of articles. However, a replacement of the arcuate guide member is required.

SUMMARY OF THE INVENTION

In view of the foregoing, the invention provides an article hand-off apparatus which utilizes the capability of the first article hand-off apparatus mentioned above which permits only the pocket size to be adjusted. Specifically, the article hand-off apparatus includes a rotatable body carrying a plurality of article receiving pockets formed around its outer peripheral surface, an arcuate guide member disposed in surrounding relationship with the outer peripheral surface of the body, and regulating means for adjusting the pocket size in accordance with the size of articles to be conveyed and for adjusting the clearance between the article and the inner peripheral surface of the arcuate guide member to a given value, whereby articles delivered from an upstream machine are received into the pockets and then angularly driven along the inner peripheral surface of the arcuate guide member to be delivered subsequently to a downstream machine. In accordance with the invention, the rotatable member and the arcuate guide member are arranged so as to be capable of integrally changing their positions in a direction substantially perpendicular to the direction of movement of articles at an article hand-off position with either upstream or downstream machine.

With this arrangement, it will be seen that the feature of the first article hand-off apparatus, i.e., that the size of articles can be changed without requiring a change of the arcuate guide member, is retained. In addition, both the rotatable body and the arcuate guide member may be integrally moved to adjust their positions as viewed in a direction substantially perpendicular to the direction of movement of articles at an article hand-off position with the filling machine, for example. In this manner, the article hand-off position with respect to the filling machine can be maintained substantially constant, thus allowing the mouth of each vessel to be located directly below the filling nozzle even though the size of the vessel may change.

BRIEF DESCRIPTION OF THE DRAWINGS

FIG. 4 is a plan view of part of FIG. 1.

DETAILED DESCRIPTION OF EMBODIMENT

Figure 1:
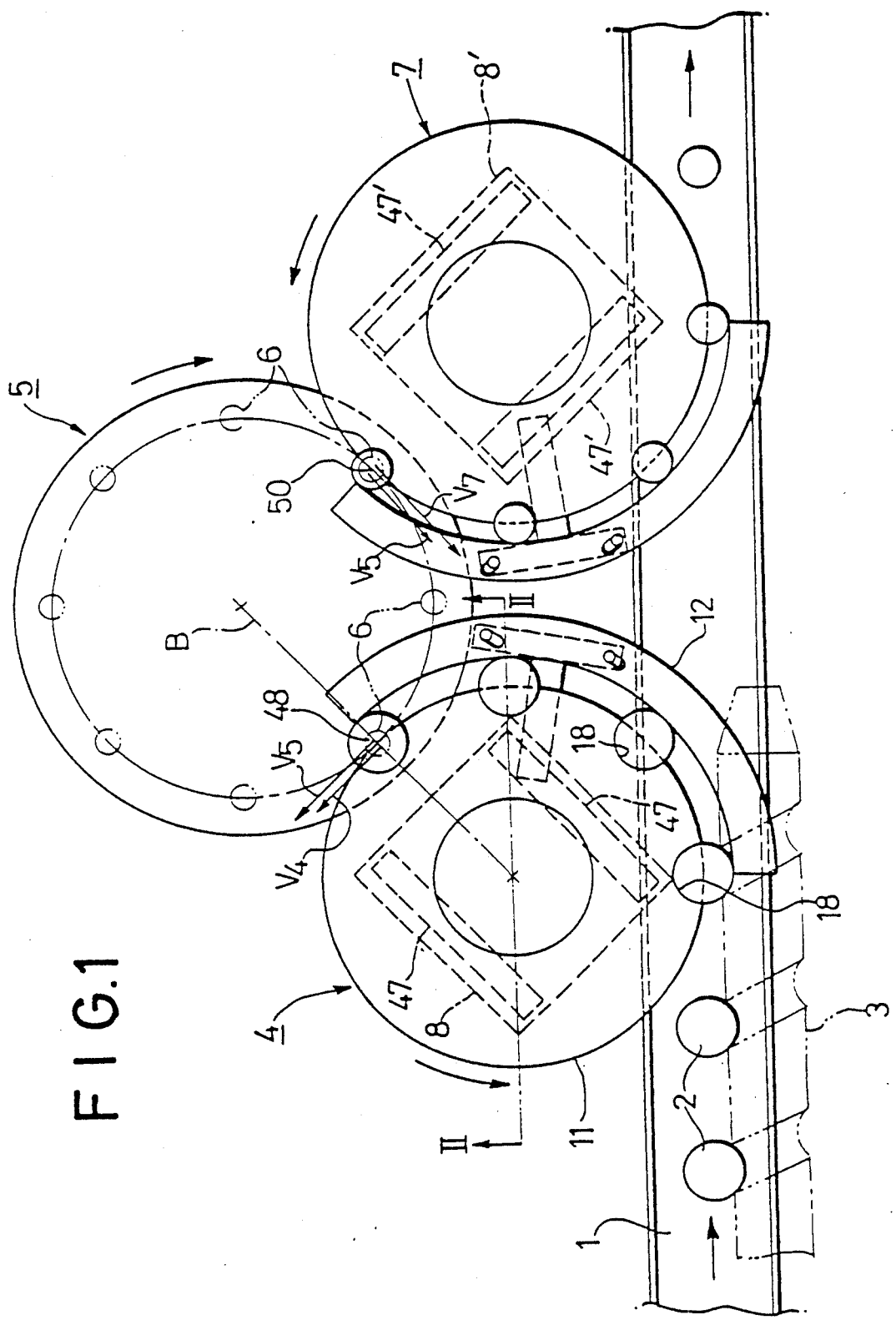
FIG. 1 is a schematic plan view of one embodiment of the invention.

Referring to the drawings, an embodiment of the invention will now be described. Referring to FIG. 1 initially, a conveyor 1 carries vessels 2 thereon. A timing screw 3 is disposed alongside a length of the conveyor 1 and transfers the vessel 2 onto an entrance star wheel 4, constituting an article hand-off apparatus, and thence to a position directly below one of filling nozzles 6 mounted on a rotational body 5 for filling the vessel 2 with a liquid to be filled, in synchronism with the operation of the body 5. After the liquid is filled into the vessel 2 by each filling nozzle 6, it is then conveyed from the body 5 to the conveyor 1 through an exit star wheel 7, which constitutes another article hand-off apparatus.

It should be understood that the rotatable body 5 is not limited to a filling machine which is provided with filling nozzles 6, but instead may comprise a machine which examines bottles for flaws or scars, a capper which applies caps to vessels, a labeller which applies labels to vessels or a rinser which cleanses vessels as well.

Figure 2:
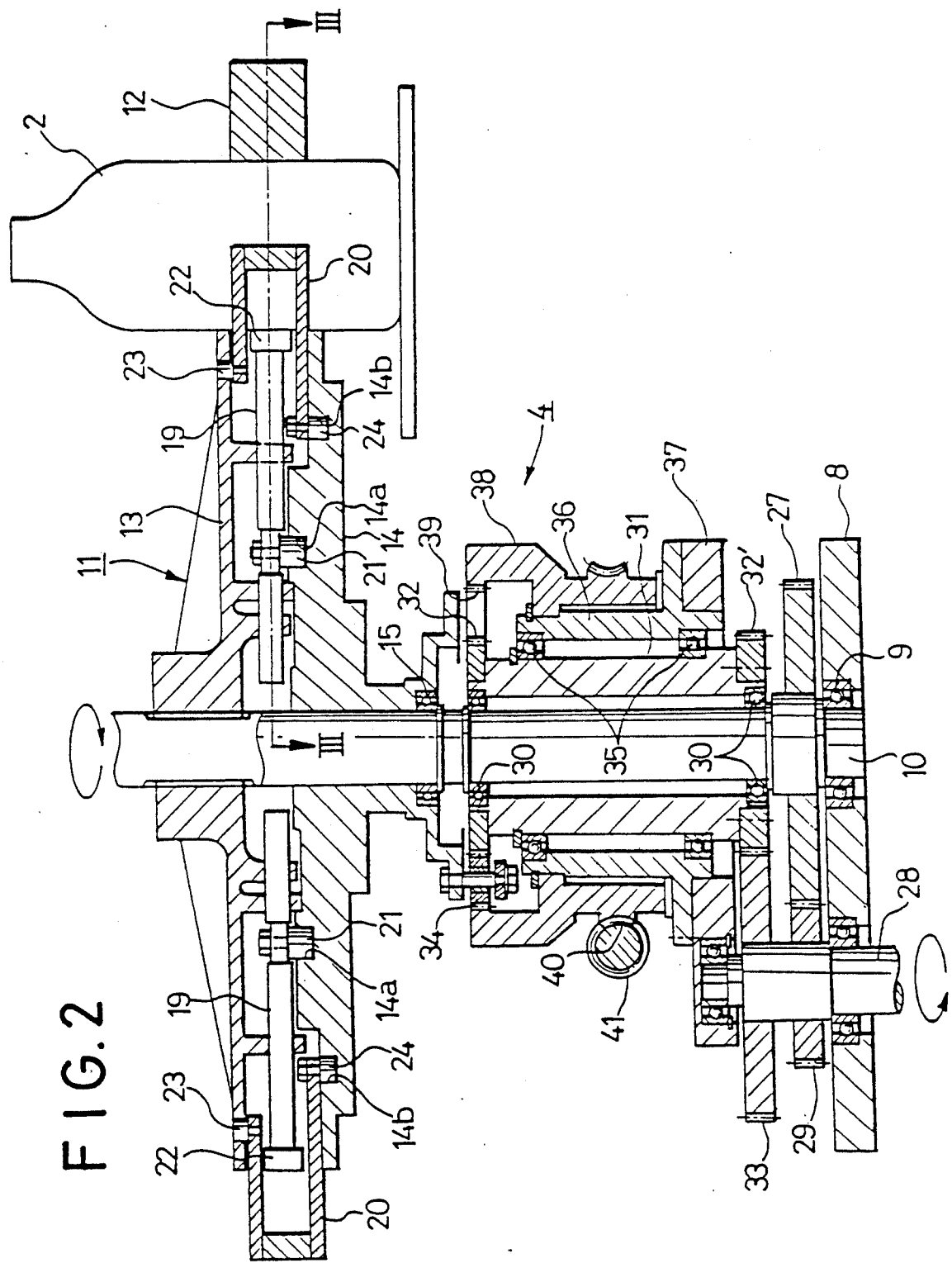
FIG. 2 is a side elevation, partly in section, taken along the line II—II shown in FIG. 1.

Referring to FIG. 2, the entrance star wheel 4 which is positioned to receive vessels comprises a vertically extending rotary shaft 10 which is rotatably mounted on a movable frame 8 by means of a bearing 9, a rotary disc 11 mounted on the top of the rotary shaft 10, and an arcuate guide member 12 (see FIG. 1) which is disposed in surrounding relationship with the outer periphery of the rotary disc 11. In actuality, the rotary disc 11 comprises a pair of discs 13, 14 having an equal diameter, with the upper disc 13 integrall and fixedly connected to the rotary shaft 10 while the lower disc 14 is rotatably mounted on the rotary shaft 10 by means of a bearing 15. However, as will be described in detail later, the both discs 13, 14 normally rotates as a unit as the rotary shaft 10 rotates.

Figure 3:
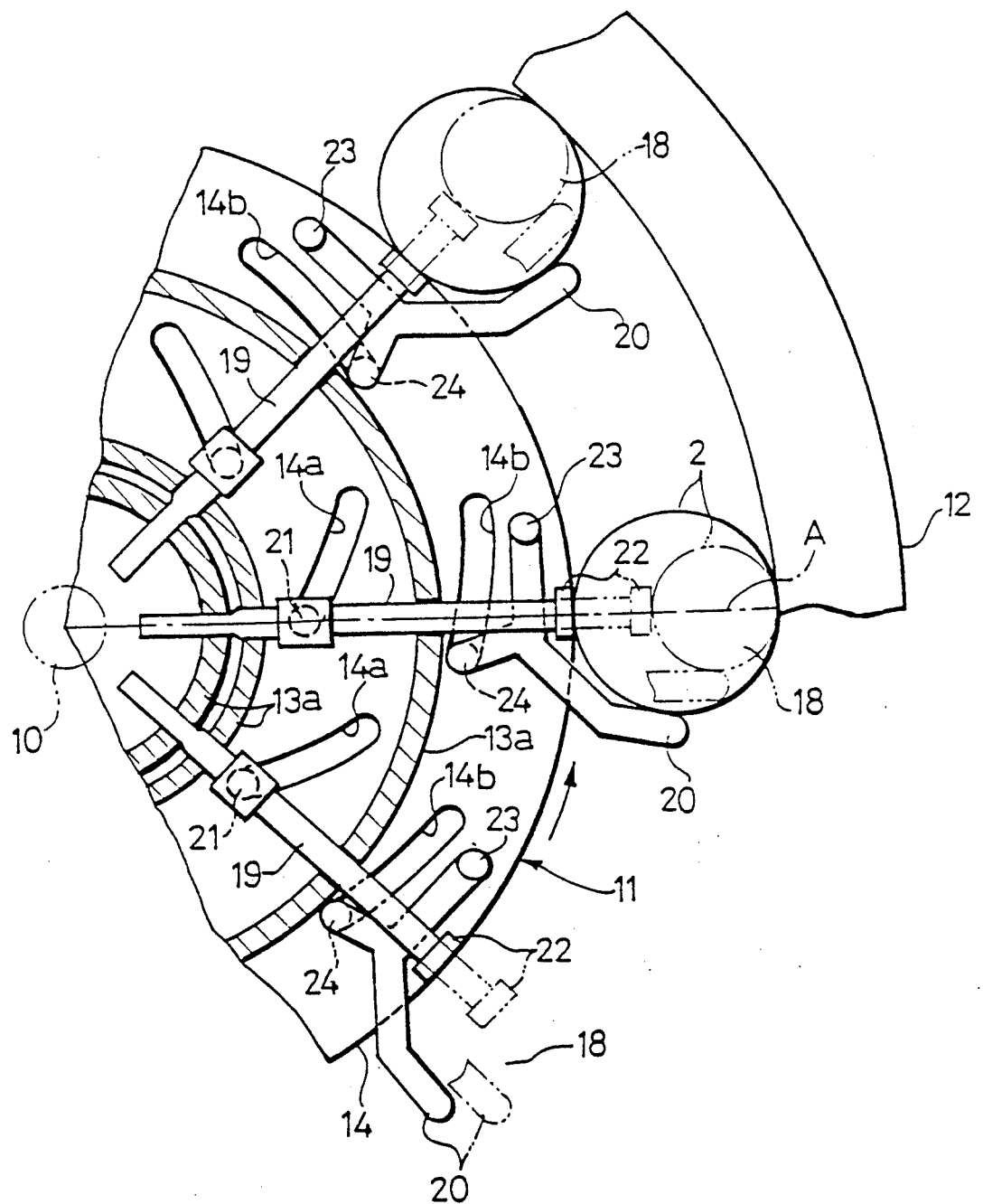
FIG. 3 is a view, partly in section, taken along the line III—III shown in FIG. 2.

Referring to FIG. 3, a plurality of article receiving pockets 18 are formed at a given interval around the outer peripheral surface of the rotary disc 11, each pocket 18 comprising a first support member 19 which supports a portion of the vessel 2 located nearer the center of rotation and a second support member 20 which supports a different portion of the vessel 2 which is rearwardly located, as viewed in a direction in which the vessel is conveyed. When the vessel 2 delivered from the timing screw 3 is received and retained within the pocket 18, the vessel is angularly driven along the inner peripheral surface of the arcuate guide member 12 while the vessel is held between the first and the second support member 19, 20 so that it may be handed to the rotatable body 5 which is disposed downstream.

Each of the first support members 19 is in the form of a rod which is disposed radially of the rotary disc 11, and radially reciprocable by being supported by three supports 13a, which are concentrically formed on a bottom surface of the upper disc 13. A cam follower 21 mounted on the first support member 9 engages a cam slot 14a formed at a given position in the upper surface of the lower disc 14.

The cam slot 14a is formed at an angle with respect to the length of the first support member 19, so that when the lower disc 14 is rotated relative to the upper disc 13 in the circumferential direction, all of the first support members 19 can be simultaneously driven to effect a radial positioning between a rearmost position shown in solid line and a foremost position shown in phantom line in FIG. 3.

Accordingly, by moving the individual first support members 19 in the radial direction, it is possible to adjust the clearance between the vessel 2 having a given size and the inner peripheral surface of the arcuate guide member 12 to an optimum value. A protective piece 22 formed of synthetic resin or the like is attached to the tip end of the first support member 19 to avoid any damage of the vessel when such member abut against the side of the vessel 2.

On the other hand, each of the second support members 20 comprises a substantially arcuate member which extends from a rear portion of the vessel 2, as viewed in the direction in which the vessel is conveyed, forwardly beyond a side of the vessel which is located nearest the center of rotation. At its free end, it is pivotally mounted on the upper disc 13 by means of a pin 23, whereby each second support member 20 is capable of rocking motion in a horizontal plane about the pin 23. A cam follower 24 is formed intermediate the length of the second support member 20 and engages a cam slot 14b, which is similar to the cam slot 14a formed in the lower disc 14, so that when the lower disc 14 is circumferentially rotated relative to the upper disc 13, all of the second support members 20 can be simultaneously driven to provide a positional adjustment between a rearmost rocked position shown in a solid line and a foremost rocked position shown in phantom lines in FIG. 3.

It will be noted that the respective second support members 20 are designed to maintain the center of a vessel on a given radial line A which passes through the center of the rotary disc 11 independently from a varying size of the vessel 2. This means that the first support members 19 and the second support members 20 allow the vessels 2 to be conveyed along the inner peripheral surface of the arcuate guide member 12 in a stabilized manner without any phase shift between the varying sizes of the vessels 2.

Referring back to FIG. 2, a gear 27 is mounted on the lower end of the rotary shaft 10 and meshes with a gear 29 mounted on a drive shaft 28 which is journalled in the movable frame 8. Hence, when the drive shaft 28 is set in motion by a motor, not shown, such rotation can be transmitted through the gears 29 and 27 and the rotary shaft 10 to cause the upper disc 13 fixedly mounted on the latter to rotate.

On the other hand, a rotary cylindrical member 31 is rotatably mounted by means of bearings 30 in surrounding relationship with the rotary shaft 10. Gears 32, 32'are fixedly mounted on the top and bottom ends of the cylindrical member 31, with the lower gear 32' in meshing engagement with a gear 33 of a greater diameter which is mounted on the top end of the drive shaft 28. The upper gear 32 meshes with three pinions 34

(only one being shown in FIG. 2) which are journalled in the lower disc 14 and circumferentially spaced apart.

On its outer periphery, the cylindrical member 31 carries bearings 35 which serve rotatably carrying a cylindrical frame 36 of an increased diameter thereon, the cylindrical frame 36 being integrally secured to the movable frame 8 through a support member 37. Another rotary cylindrical member 38 is rotatably mounted in surrounding relationship with the cylindrical frame 36 and fixedly carries an internally toothed gear 39 on its top end which meshes with the respective pinions 34.

The outer periphery of the rotary cylindrical member 38 is formed with a worm wheel 40 meshing with a worm gear 41 which is coupled to a servo motor 42 (see FIG. 4) mounted on the support member 37 which is in turn integral with the movable frame 8. The rotary cylindrical member 38 is normally maintained at rest by the meshing engagement between the worm wheel 40 and the worm gear 41.

Accordingly, when the drive shaft 28 is set in motion while maintaining the rotary cylindrical member 38 at rest, such rotation can be transmitted to the rotary cylindrical member 31 through the gears 32, 32', the rotation of which is in turn effective to cause the pinions 34, meshing with the gear 32 on the cylindrical member 31, to revolve around the gear 32 while rotating themselves and while maintaining their meshing engagement with the internally toothed gear 39 on the cylindrical member 38. As a consequence, the lower disc 14 is driven for rotation by the revolving motion of the pinions 34. The direction and the number of revolutions of the lower disc 14 can be made coincident with the direction and the number of revolutions of the upper disc 13 by suitably choosing the number of teeth in the gear train of the drive system. Thus, when the drive shaft 28 is set in motion while maintaining the cylindrical member 38 at rest, both the upper and the lower disc 13, 14 can be driven for integral rotation.

By contrast, when the servo motor 42 is used to drive the rotary cylindrical member 38 for rotation through the worm gear 41 and the worm wheel 40, the engagement between the internally toothed gear 39 on the member 38 and the pinions 34 is effective to cause a rotation of the lower disc 14 relative to the upper disc 13, whereby the first support members 19 and the second support members 20, which define individual pockets 18 therebetween, can be driven to achieve a positional adjustment within an extent defined by the rearmost position and the foremost position, shown in FIG. 3, in the manner mentioned above. Referring to FIG. 4, a servo motor 46 mounted on a stationary frame, not shown, is coupled to the movable frame 8 and functions to drive the movable frame 8 for translation along a pair of guide rails 47 which are mounted on the stationary frame. To allow the drive shaft 28 which is journalled in the movable frame 8 to move integrally with the movable frame 8, the drive shaft 28 is connected to the motor through a univeral joint mechanism, not shown.

The guide rails 47 extend in a direction parallel to a line B which joins the center of rotation of the rotatable body 5 and the center of rotation of the star wheel 4, whereby the movable frame 8 can be driven for movement in a direction perpendicular to the direction of movement of the article at an article hand-off position 48 between the entrance star wheel 4 and the rotatable body 5 or in a direction perpendicular to the tangential direction. The arcuate guide member 12 is integrally coupled to the support member 37 which is integral with the movable frame 8, by a T-shaped connecting member 49, so that when the movable frame 8 moves along the guide rails 47, the arcuate guide member 12 can be integrally driven for movement therewith.

The exit star wheel 7 which functions to carry the vessel away is similarly constructed as the entrance star wheel 4, and therefore will not be described in detail. However, it will be seen from FIG. 1 that the exit star wheel 7 includes a movable frame 8' which can be driven for movement in a direction perpendicular to the direction in which an article travels as it is to be handed off the rotatable member 5 to the exit star wheel 7 at an article hand-off position 50.

When using the described arrangement in connection with vessels having a maximum diameter, the first support members 19 which define the individual pockets 18 of the entrance star wheel 4 will be located at its solid line position by the cooperation between the cam followers 21 thereon and the cam slots 14a formed in the lower disc 14 which undergoes a relative rotation, thus achieving an optimum clearance between the vessels having the maximum diameter and the inner peripheral surface of the arcuate guide member 12. The second support members 20, which also define the pockets 18, also assume the solid line position as a result of the cooperation between the cam followers 24 thereon and the cam slots 14b.

Referring to FIG. 4, the servo motor 46 is started to translate the movable frame 8 and the rotary disc 11 along the pair of guide rails 47 to locate the arcuate guide member 12 at its solid line position, whereby the locus of movement of the center of vessels having the maximum diameter may be brought into coincidence with the locus of movement of the filling nozzle 6 on the rotatable body 5 at the article hand-off position 48. It should be understood that such ajustment takes place also for the exit star wheel 7.

When changing the vessels from those having the maximum diameter to those having a minimum diameter, the servo motor 42 is set in motion to transmit its rotation through the worm gear 41 and the worm wheel 40 to cause the rotary cylindrical member 38 to rotate, whereby the internal toothed gear 39 thereon which engages the pinion 34 is effective to cause the lower disc 14 to rotate relative to the upper disc 13. Thereupon, the first support members 19 which define the individual pockets 18 are caused to advance from their solid line position to their phantom line position as a result of the cooperation between the cam followers 21 and the cam slots 14a formed in the lower disc 14 which has undergone the relative rotation, thus achieving an optimum clearance between the vessels having the minimum diameter and the inner peripheral surface of the arcuate guide member 12. The second support members 20, which also define the pockets 18, are also forwardly rocked from their solid line position to their phantom line position as a result of the cooperation between the cam followers 24 thereon and the cam slots 14b, thus maintaining the center of vessels having the minimum diameter on the line A which joins the center of the vessels having the maximum diameter and the center of the rotary disc 11.

The servo motor 46 is then set in motion to move the movable frame 8 and the rotary disc 11 along the pair of guide rails 47 and also to move the arcuate guide member 12 from its solid line position to its phantom line position (FIG. 4), so that the locus of movement of the center of vessels having the minimum diameter is brought into coincidence with the locus of movement of the filling nozzle 6 on the rotatable body 5 at the article hand-off position 48. A similar adjustment also takes place for the exit star wheel 7.

It will be understood that when transferring the vessels having the maximum diameter, the distance from the center of rotation of the rotary disc 11 to the center of the vessel having the maximum diameter will be at its minimum value for each of the star wheels 4, 7, and hence the article conveying speed of the respective star wheels 4, 7 will also be at its minimum value. On the other hand, when transferring the vessels having the minimum diameter, a corresponding distance will be at its maximum value as is the article conveying speed of the respective star wheels 4, 7. However, it will be understood that when transferring a vessel from the entrance star wheel 4 to the rotatable body 5 or when transferring a vessel from the rotatable body 5 to the exit star wheel 7, it will be seen that there is a need to choose an upstream side conveying speed which is substantially equal to or greater than a downstream side conveying speed in order to assure a smooth transfer.

At this end, in the present embodiment, a maximum conveying speed $V_4$ with which the entrance star wheel 4 conveys articles of a minimum size is chosen to be substantially equal to or less than an article conveying speed $V_5$ of the rotatable body 5 while a minimum conveying speed $V_7$ with which the exit star wheel 7 conveys articles of a maximum size is chosen to be substantially equal to or greater than an article conveying speed $V_5$ of the rotatable body 5. When such choice is made, it will be appreciated that when transferring vessels of a maximum size, the conveying speeds $V_4$, $V_7$ with which the respective star wheels 4, 7 convey articles will be as their minimum values, but the article conveying speed $V_7$ of the exit star wheel 7 will be substantially equal to or greater than the article conveying speed $V_5$ of the rotatable body 5. On the other hand, the article conveying speed $V_4$ of the entrance star wheel 4 will obviously be less than the article conveying speed $V_5$ of the rotatable body 5. In this manner, it is assured that vessels having a maximum size can be smoothly transferred from the entrance star wheel 4 to the rotatable body 5 and thence to the exit star wheel 7.

By contrast, when transferring vessels having a minimum size, the article conveying speeds $V_4$, $V_7$ of the respective star wheels 4, 7 will be as their maximum values, but the article conveying speed $V_4$ of the entrance star wheel 4 will be substantially equal to or less than the article conveying speed $V_5$ of the rotatable body 5 while the article conveying speed $V_7$ of the exit star wheel 7 will obviously be greater than the article conveying speed $V_5$ of the rotatable body 5. Again, it is assured that vessels having a minimum size can be smoothly transferred from the entrance star wheel 4 to the rotatable body 5 and thence to the exit star wheel 7.

It should be understood that when changing the size of vessels, it is necessary that the timing screw 3 be replaced by another which corresponds to the size of new vessels and be located at a selected position between the rotary disc 11 and the arcuate guide member 12 and that the spacing between guide members, not shown, which are disposed on the opposite sides of the conveyor 1, be adjusted in accordance with the size of the vessels.

In the described embodiment, regulating means which regulates the size of the pockets in accordance with the articles being conveyed comprises the first support members 19 and the second support members 20. However, alternatively, a pocket may be defined by a pair of crossing arms, as known in the art, and the angle therebetween may be adjusted to change the size of a pocket. As a further alternative, a pair of discs may be formed with notches which partly overlap each other to define pockets, and a pocket size may be adjusted by controlling the degree of overlap between the both notches.

While the rotatable body 5 comprises a single rotatable body in the embodiment disclosed, it may instead comprise a plurality of rotatable bodies which are driven for synchronous rotation. Additionally, while the lower disc 14 is utilized to achieve a simultaneous positional adjustment of the first and the second support members 19, 20, the positional adjustment of these members may be separately done so that the apparatus may serve distorted vessels and flat vessels.

Having described the invention in terms of a preferred embodiment thereof, it should be understood that the above disclosure is exemplary only and that a number of changes, modifications and substitutions therein will readily occur to one skilled in the art from the above disclosure without departing from the spirit and scope of the invention defined by the appended claims.

What is claimed is:

1. Article hand-off apparatus including a rotatable body supported for rotation about a rotational axis and having a plurality of article receiving pockets formed around its outer peripheral surface, a rigid, arcuate guide member which is fixed relative to said rotational axis and disposed in surrounding relationship with the outer peripheral surface of the rotatable body, and regulating means for adjusting the size of the pockets in accordance with the size of articles to be conveyed and for adjusting a clearance between such article and the inner peripheral surface of the arcuate guide member to a given value, the arrangement being such that an article handed off an upstream machine is received within one of the pockets and then angularly driven to move along the inner peripheral surface of the arcuate guide member to be delivered to a downstream machine; wherein the rotatable body and the arcuate guide member are disposed so as to be capable of integrally and in unison adjusting their positions, including the position of said rotational axis, in a direction substantially perpendicular to a direction in which an article moves at an article hand-off position between said rotatable body and one of the upstream machine and the downstream machine.

2. Article hand-off apparatus including a rotatable body having a plurality of article receiving pockets formed around its outer peripheral surface, an arcuate guide member disposed in surrounding relationship with the outer peripheral surface of the rotatable body, and regulating means for adjusting the size of the pockets in accordance with the size of articles to be conveyed and for adjusting a clearance between such article and the inner peripheral surface of the arcuate guide member to a given value, the arrangement being such that an article handed off an upstream machine is received within one of the pockets and then angularly driven to move along the inner peripheral surface of the arcuate guide member to be delivered to a downstream machine; wherein the rotatable body and the arcuate guide member are disposed so as to be capable of integrally adjusting their positions in a direction substantially perpendicular to a direction in which an article moves at an article hand-off position between said rotatable body and one of the upstream machine and the downstream machine, said apparatus further including a guide rail which extends in said direction substantially perpendicular to the direction of movement of an article at the article hand-off position, and a movable frame mounted on the guide rail in a displaceable manner, the rotatable body being rotatably mounted on the movable frame and the arcuate guide member being also mounted on the movable frame.

3. Article hand-off apparatus according to claim 2, further including a servo motor mounted on a stationary frame and mechanically coupled to the movable frame so as to cause a movement thereof.

4. Article hand-off apparatus including a rotatable body having a plurality of article receiving pockets formed around its outer peripheral surface, an arcuate guide member disposed in surrounding relationship with the outer peripheral surface of the rotatable body, and regulating means for adjusting the size of the pockets in accordance with the size of articles to be conveyed and for adjusting a clearance between such article and the inner peripheral surface of the arcuate guide member to a given value, the arrangement being such that an article handed off an upstream machine is received within one of the pockets and then angularly driven to move along the inner peripheral surface of the arcuate guide member to be delivered to a downstream machine; wherein the rotatable body and the arcuate guide member are disposed so as to be capable of integrally adjusting their positions in a direction substantially perpendicular to a direction in which an article moves at an article hand-off position between said rotatable body and one of the upstream machine and the downstream machine, and wherein the regulating means comprises a first support member which supports a portion of the article which is located nearest the center of rotation of the rotatable body, and a second support member which supports a rear portion of the article as viewed in the direction in which it is conveyed, the first support member being movable radially of the rotatable body and the second support member being movable circumferentially of the rotatable body.

5. Article hand-off apparatus according to claim 4, in which the rotatable body comprises a first disc on which the first and the second support members are mounted, and a second disc which is rotatable relative to the first disc, each of the first and the second support members carrying a cam follower which engages a corresponding cam on the second disc, a rotation of the second disc relative to the first disc achieving a positional adjustment of the first and the second support members.

6. Article hand-off apparatus according to claim 5 in which the first disc is fixedly mounted on a rotary shaft for the rotatable body, the rotary shaft being connected to a drive source, the second disc being rotatably mounted on the rotary shaft, further including a first rotary cylindrical member connected to the drive source and rotatably mounted in surrounding relationship with the rotary shaft, and a second rotary cylindrical member rotatably mounted in surrounding relationship with the first rotary cylindrical member, the second disc carrying a pinion which engages a gear on the first rotary cylindrical member and an internally toothed gear on the second rotary cylindrical member so that when the second rotary cylindrical member remains at rest, the second disc is caused to rotate at the same speed as the first disc while when the second rotary cylindrical member rotates, the second disc undergoes a relative rotation with respect to the first disc.

7. Article hand-off apparatus according to claim 6 in which a worm wheel is defined on the outer periphery of the second rotary cylindrical member and meshes with a worm gear which is journalled in a movable frame which causes an integral movement of the rotatable body and the arcuate guide member, the arrangement being such that when a rotation of the worm gear is prevented, the worm wheel and the second rotary cylindrical member are maintained at rest.

8. Article hand-off apparatus comprising a rotatable body for applying a desired processing operation to an article conveyed thereto, an entrance star wheel supported for roration about a rotational axis and disposed for synchronous rotation with the rotatable body for conveying an article onto the rotatable body, an exit star wheel supported for rotation about a rotational axis and disposed for synchronous rotation with the rotatable body for conveying an article out of the rotatable body, each of the star wheels having a plurality of article receiving pockets formed around its outer peripheral surface, a rigid, arcuate guide member associated with each of the star wheels and disposed in surrounding relationship with the outer peripheral surface thereof, each said guide member being fixed relative to the rotational axis of the associated star wheel, and regulating means for adjusting the size of pockets in accordance with the size of articles to be conveyed and for adjusting a clearance between such article and the inner peripheral surface of the arcuate guide member to a given value; wherein the respective star wheels, including the respective rotational axes thereof and the associated arcuate guide members, are integrally movable in unison in a direction substantially perpendicular to the direction in which an article travels at an article hand-off position between the respective star wheel and the rotatable body, the arrangement being such that when articles having a minimum size are to be conveyed by the respective star wheels, the respective star wheels and the respective rotational axes thereof are moved away from the rotatable body to a remote position so that a maximum article conveying speed of the entrance star wheel is substantially equal to or less than an article conveying speed of the rotatable body while when articles having a maximum size are to be conveyed by the respective star wheels, the respective star wheels and the respective rotational axes thereof are moved toward the rotatable body from the remote position to a close position so that a minimum article conveying speed to the exit star wheel is substantially equal to or greater than an article conveying speed of the rotatable body.

* * * * *

UNITED STATES PATENT AND TRADEMARK OFFICE
CERTIFICATE OF CORRECTION

PATENT NO. : 5 046 599
DATED : September 10, 1991
INVENTOR(S) : Itirou HAMANO It is certified that error appears in the above-identified patent and that said Letters Patent is hereby corrected as shown below:

Column 10, line 59; change "speed to" to ---speed of---.

Signed and Sealed this

Sixth Day of April, 1993

Attest:

STEPHEN G. KUNIN

*Attesting Officer*     Acting Commissioner of Patents and Trademarks